I. BURLEY.
GRUBBING-MACHINE.
No. 186,228. Patented Jan. 16, 1877.
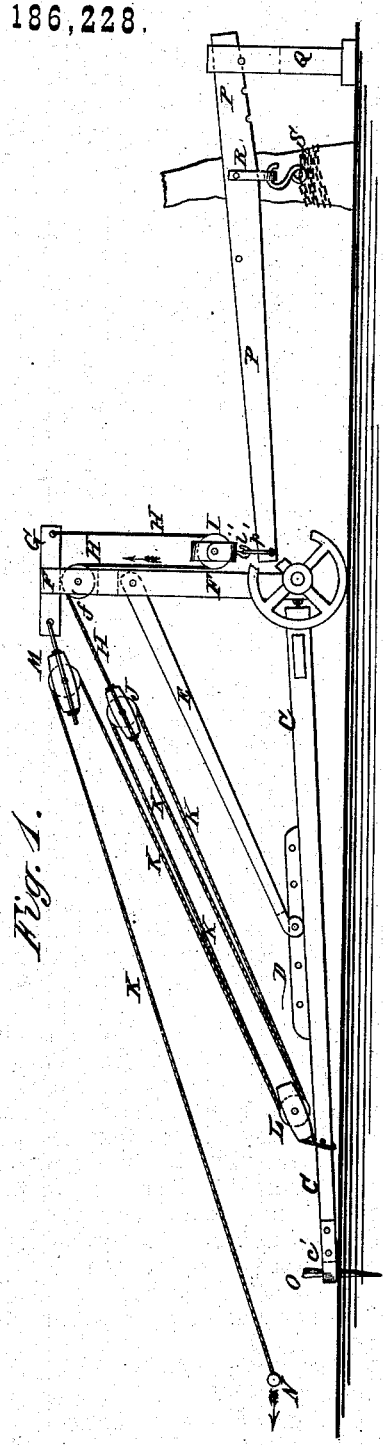
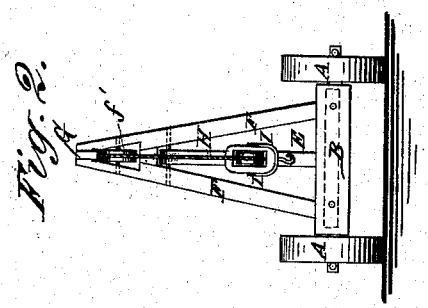
WITNESSES:
H. Rydquist.
J.H. Scarborough
INVENTOR:
Ira Burley
BY
[signature]
ATTORNEYS.

UNITED STATES PATENT OFFICE.

IRA BURLEY, OF RED WING, MINNESOTA.

IMPROVEMENT IN GRUBBING-MACHINES.

Specification forming part of Letters Patent No. 186,228, dated January 16, 1877; application filed November 4, 1876.

*To all whom it may concern:*

Be it known that I, IRA BURLEY, of Red Wing, in the county of Goodhue and State of Minnesota, have invented a new and useful Improvement in Grubbing-Machines, of which the following is a specification:

Figure 1 is a side view of my improved machine arranged for use. Fig. 2 is a rear view of the same, the lever being removed.

Similar letters of reference indicate corresponding parts.

The object of this invention is to furnish an improved grubbing-machine, which shall be simple in construction, convenient in use, and of great power, enabling the stumps to be readily drawn, and which, at the same time, may be readily moved from place to place and adjusted for use.

The invention consists in the combination of the wheels and axle, the tongue, the adjusting-bar, the adjustable brace, the uprights, the cross-bar, the two ropes, and the four pulley-blocks with each other.

A are the wheels, which revolve upon the journals of the axle B. The axle is made wide, and the journals are formed upon the rear parts of its ends, as shown in Fig. 1, so that a downward pressure upon the said axle may hold the forward end of the tongue C, attached to its forward side, down to the ground. The tongue C is connected with the forward side of the axle B by eyebolts or other suitable couplings. To the upper side of the middle part of the tongue C is attached a bar, D, through which are formed a number of holes, to receive the pin or bolt by which the forward end of the brace-bar E is secured to the tongue, so that by adjusting the forward end of the said brace the uprights F may be held erect even upon uneven ground. The rear end of the brace E is secured to and between the upper parts of the uprights F, the lower ends of which are firmly attached to the axle B near its ends. The upper ends of the uprights F meet at an angle, and are firmly secured to each other.

To the upper ends of the uprights F is attached the middle part of a short cross-bar, G, to the rear end of which is attached the end of a rope, H. The rope H passes around the pulley of the pulley-block I, passes over a pulley, $f'$, pivoted in a recess in the upper ends of the uprights F, and its other end is attached to a pulley-block, J.

To the pulley-block J is attached the end of a second rope, K, which passes around one of the pulleys of the pulley-block L, attached to the forward part of the tongue C. The rope K passes thence to and around the pulley of the block J, to and around the other pulley of the block L, thence to and around the pulley of the block M, attached to the forward end of the cross-bar G of the uprights F, and to its forward end is attached the whiffletree N, to which the horse is hitched.

To the forward end of the tongue C is attached a loop or clevis, $c'$, to receive an iron pin, O, to be driven into the ground to keep the machine from moving about while being used.

To the pulley-block I is swiveled a hook, $i'$, to be hooked into a loop, $p'$, attached to the forward end of the lever P. The rear end of the lever P passes through a slot in the upper end of the fulcrum-post Q, and has a notch formed in its lower side to receive a bolt or pin, attached to said post to serve as a fulcrum to said lever. Several notches are formed in the lever P to receive the fulcrum-bolt, to enable the position of the fulcrum-post to be adjusted to regulate the leverage, and as circumstances may require.

The post Q is provided with a wide base to give it stability, and to prevent it from being forced into the ground by the pressure upon it.

To the lever P is attached a strong clevis, R, to receive the hook of the chain S, that is secured to the stump to be pulled. Several holes are formed in the lever P to receive the bolt of the clevis R, so that the position of said clevis may be adjusted as required.

For drawing small stumps, roots, &c., the lever P need not be used; but the said stumps may be drawn by grapples or chains attached to the hook $i'$ of the pulley-block I.

Having thus described my invention, I claim as new and desire to secure by Letters Patent—

The combination of the wheels and axle A B, the tongue C, the adjusting-bar D, the adjustable brace E, the uprights F, the cross-bar G, the two ropes H K, the pulley $f'$, and the four pulley-blocks I J L M with each other, substantially as herein shown and described.

IRA BURLEY.

Witnesses:
 WILLIAM E. SPENCER,
 EZEKIEL BURLEY.